US009458411B2

(12) United States Patent
Murphy et al.

(10) Patent No.: US 9,458,411 B2
(45) Date of Patent: Oct. 4, 2016

(54) LIPID-BASED WAX COMPOSITIONS SUBSTANTIALLY FREE OF FAT BLOOM AND METHODS OF MAKING

(75) Inventors: Timothy A. Murphy, Yorkville, IL (US); Stephen E. Russell, Grayslake, IL (US)

(73) Assignee: CARGILL, INCORPORATED, Wayzata, MN (US)

( * ) Notice: Subject to any disclaimer, the term of this patent is extended or adjusted under 35 U.S.C. 154(b) by 344 days.

(21) Appl. No.: 13/301,401

(22) Filed: Nov. 21, 2011

(65) Prior Publication Data

US 2012/0124892 A1 May 24, 2012

Related U.S. Application Data

(60) Provisional application No. 61/416,586, filed on Nov. 23, 2010.

(51) Int. Cl.
*C11C 5/00* (2006.01)
*B29C 39/02* (2006.01)
*C11C 5/02* (2006.01)

(52) U.S. Cl.
CPC ................ *C11C 5/002* (2013.01); *C11C 5/023* (2013.01)

(58) Field of Classification Search
USPC ............ 44/275; 424/94.2; 426/610; 264/299
See application file for complete search history.

(56) References Cited

U.S. PATENT DOCUMENTS

| | | | | |
|---|---|---|---|---|
| 1,935,946 | A | 11/1933 | Egan et al. | |
| 1,954,659 | A | 4/1934 | Will | |
| 2,294,229 | A | 8/1942 | Fiero | |
| 2,468,799 | A | 5/1949 | Ziels et al. | |
| 2,784,891 | A | 3/1957 | Thielke | |
| 3,448,178 | A | 6/1969 | Flanagan | |
| 3,630,697 | A | 12/1971 | Duling et al. | |
| 3,645,705 | A | 2/1972 | Miller et al. | |
| 3,744,956 | A | 7/1973 | Hess | |
| 3,844,706 | A | 10/1974 | Tsaras | |
| 4,118,203 | A | 10/1978 | Beardmore et al. | |
| 4,134,718 | A | 1/1979 | Kayfetz et al. | |
| 4,292,088 | A | 9/1981 | Scheuffgen et al. | |
| 4,293,345 | A | 10/1981 | Zeilstra et al. | |
| 4,314,915 | A | 2/1982 | Wiegers et al. | |
| 4,390,590 | A | 6/1983 | Saunders et al. | |
| 4,411,829 | A | 10/1983 | Schulte-Elte et al. | |
| 4,434,306 | A | 2/1984 | Kobayashi et al. | |
| 4,507,077 | A | 3/1985 | Sapper | |
| 4,545,941 | A | 10/1985 | Rosenburg | |
| 4,554,107 | A | 11/1985 | Takao | |
| 4,567,548 | A | 1/1986 | Schneeberger | |
| 4,608,011 | A | 8/1986 | Comstock | |
| 4,614,625 | A | 9/1986 | Wilson | |
| 4,623,488 | A | 11/1986 | Takao | |
| 4,714,496 | A | 12/1987 | Luken, Jr. et al. | |
| 4,759,709 | A | 7/1988 | Luken, Jr. et al. | |
| 4,813,975 | A | 3/1989 | Poulina et al. | |
| 4,842,648 | A | 6/1989 | Phadoemchit et al. | |
| 4,855,098 | A | 8/1989 | Taylor | |
| 4,923,708 | A | 5/1990 | Given, Jr. | |
| 5,023,102 | A * | 6/1991 | Given, Jr. | 426/610 |
| 5,171,329 | A | 12/1992 | Lin | |
| 5,258,197 | A | 11/1993 | Wheeler et al. | |
| 5,338,187 | A | 8/1994 | Elharar | |
| 5,380,544 | A | 1/1995 | Klemann et al. | |
| 5,578,089 | A | 11/1996 | Elsamaloty | |
| 5,660,865 | A | 8/1997 | Pedersen et al. | |
| 5,700,516 | A | 12/1997 | Sandvick et al. | |
| 5,723,137 | A | 3/1998 | Wahle et al. | |
| 5,753,015 | A | 5/1998 | Sinwald et al. | |
| 5,843,194 | A | 12/1998 | Spaulding | |
| 5,885,600 | A | 3/1999 | Blum et al. | |
| 5,888,487 | A | 3/1999 | Baumoeller et al. | |
| 6,001,286 | A | 12/1999 | Sleeter | |

(Continued)

FOREIGN PATENT DOCUMENTS

| | | |
|---|---|---|
| CN | 1844340 A | 10/2006 |
| DE | 19956226 | 5/2001 |

(Continued)

OTHER PUBLICATIONS

International Search Report for International Application No. PCT/US2011/061603, dated Feb. 10, 2012, 3 pages.
International Preliminary Report on Patentability for International Application No. PCT/US2011/061603, dated May 28, 2013, 6 pages.
Behren et al., "Beeswax and other Non-Paraffin Waxes," Presented at NCA Technical Meeting, Jun. 19-20, 1991, 6 pages.
Bell et al., "Sperm Oil Replacements: Synthetic Wax Esters from Selectively Hydrogenated Soybean and Linseed Oils," Journal of the American Chemical Society, Jun. 1997, vol. 54, pp. 259-263.
Erhan et al. , "Drying Properties of Metathesized Soybean Oil," Journal of American Oil Chemists' Society, AOCS Press, vol. 74, No. 6, 1997, pp. 703-706.

(Continued)

*Primary Examiner* — Prem C Singh
*Assistant Examiner* — Chantel Graham

(57) ABSTRACT

Lipid-based wax compositions and their methods of making are provided for compositions substantially free of fat bloom. The compositions comprise 0.1-10 percent by weight triacylglycerides, 30-95 percent by weight monoacylglycerides and diacylglycerides combined, and 0.1-65 percent by weight fatty acids. The methods comprise blending the monoacylglycerides, diacylglycerides, triacylglycerides, and fatty acids by heating the lipid-based wax composition at a sufficiently high temperature to destroy substantially all crystal structure within the lipid-based wax composition. The methods further comprise pouring the lipid-based wax composition into a mold or a container having a surface and a core, wherein the pouring is conducted at a temperature at least 15° C. greater than the congeal point of the lipid-based wax composition. The methods further comprise cooling the lipid-based wax composition under conditions sufficient to cool the core to at least 5° C. below the congeal point of the lipid-based wax composition in 30-90 minutes.

22 Claims, No Drawings

(56) References Cited

U.S. PATENT DOCUMENTS

| | | | |
|---|---|---|---|
| 6,019,804 | A | 2/2000 | Requejo et al. |
| 6,022,402 | A | 2/2000 | Stephenson et al. |
| 6,063,144 | A | 5/2000 | Calzada et al. |
| 6,099,877 | A | 8/2000 | Schuppan |
| 6,103,308 | A | 8/2000 | Floyd et al. |
| 6,106,597 | A | 8/2000 | Starks et al. |
| 6,123,979 | A | 9/2000 | Hepburn et al. |
| 6,127,326 | A | 10/2000 | Dieckmann et al. |
| 6,132,742 | A | 10/2000 | Le Bras et al. |
| 6,156,369 | A | 12/2000 | Eger et al. |
| 6,201,053 | B1 | 3/2001 | Dieckmann et al. |
| 6,214,918 | B1 | 4/2001 | Johnson et al. |
| 6,224,641 | B1 | 5/2001 | Matzat et al. |
| 6,238,926 | B1 | 5/2001 | Liu et al. |
| 6,255,375 | B1 | 7/2001 | Michelman |
| 6,258,965 | B1 | 7/2001 | O'Lenick, Jr. |
| 6,262,153 | B1 | 7/2001 | Webster et al. |
| 6,276,925 | B1 | 8/2001 | Varga |
| 6,277,310 | B1 | 8/2001 | Sleeter |
| 6,284,007 | B1 | 9/2001 | Tao |
| 6,497,735 | B2 | 12/2002 | Tao |
| 6,503,077 | B2 | 1/2003 | Orth et al. |
| 6,503,285 | B1 | 1/2003 | Murphy |
| 6,582,748 | B1 | 6/2003 | Loh et al. |
| 6,586,506 | B2 | 7/2003 | Webster et al. |
| 6,599,334 | B1 | 7/2003 | Anderson |
| 6,645,261 | B2 | 11/2003 | Murphy et al. |
| 6,673,763 | B1 | 1/2004 | Hansen et al. |
| 6,730,137 | B2 | 5/2004 | Pesu et al. |
| 6,733,548 | B2 | 5/2004 | Rasmussen et al. |
| 6,758,869 | B2 | 7/2004 | Roeske et al. |
| 6,770,104 | B2 | 8/2004 | Murphy |
| 6,773,469 | B2 | 8/2004 | Murphy |
| 6,797,020 | B2 | 9/2004 | Murphy |
| 6,824,572 | B2 | 11/2004 | Murphy |
| 6,846,573 | B2 | 1/2005 | Seydel |
| 6,852,140 | B1 | 2/2005 | Roeske |
| 6,890,982 | B2 | 5/2005 | Borsinger et al. |
| 6,943,262 | B2 | 9/2005 | Kodali et al. |
| 7,037,439 | B2 | 5/2006 | Tavares |
| 7,128,766 | B2 | 10/2006 | Murphy et al. |
| 7,176,171 | B2 | 2/2007 | Nieendick et al. |
| 7,192,457 | B2 | 3/2007 | Murphy et al. |
| 7,217,301 | B2 | 5/2007 | Murphy et al. |
| 7,387,649 | B2 | 6/2008 | Tao |
| 7,462,205 | B2 | 12/2008 | Murphy |
| 7,510,584 | B2 | 3/2009 | Cap |
| 7,569,084 | B2 | 8/2009 | Tao et al. |
| 7,588,607 | B1 * | 9/2009 | Cap ................................ 44/275 |
| 7,601,184 | B2 | 10/2009 | Tischendorf |
| 7,637,968 | B2 | 12/2009 | Murphy |
| 7,795,336 | B2 | 9/2010 | Paul et al. |
| 7,833,294 | B2 | 11/2010 | Murphy et al. |
| 2001/0013195 | A1 | 8/2001 | Tao |
| 2001/0051680 | A1 | 12/2001 | Webster et al. |
| 2002/0005007 | A1 | 1/2002 | Roeske et al. |
| 2002/0144455 | A1 | 10/2002 | Bertrand et al. |
| 2002/0157303 | A1 | 10/2002 | Murphy et al. |
| 2003/0008257 | A1 | 1/2003 | Tao |
| 2003/0017431 | A1 | 1/2003 | Murphy |
| 2003/0022121 | A1 | 1/2003 | Biggs |
| 2003/0046860 | A1 | 3/2003 | Tiffany et al. |
| 2003/0057599 | A1 | 3/2003 | Murphy et al. |
| 2003/0061760 | A1 | 4/2003 | Tao et al. |
| 2003/0091949 | A1 | 5/2003 | Pesu et al. |
| 2003/0110683 | A1 | 6/2003 | Murphy |
| 2003/0134244 | A1 | 7/2003 | Gray et al. |
| 2003/0198826 | A1 | 10/2003 | Seydel |
| 2003/0207971 | A1 | 11/2003 | Stuart, Jr. et al. |
| 2003/0213163 | A1 | 11/2003 | Berger et al. |
| 2004/0000088 | A1 | 1/2004 | Wesley |
| 2004/0037859 | A1 | 2/2004 | Cecchi et al. |
| 2004/0047886 | A1 | 3/2004 | Murphy et al. |
| 2004/0076732 | A1 | 4/2004 | Valix |
| 2004/0088907 | A1 | 5/2004 | Murphy |
| 2004/0088908 | A1 | 5/2004 | Murphy |
| 2004/0138359 | A1 | 7/2004 | Dinkelaker et al. |
| 2004/0200136 | A1 | 10/2004 | Tao et al. |
| 2004/0221503 | A1 | 11/2004 | Murphy et al. |
| 2004/0221504 | A1 | 11/2004 | Murphy |
| 2004/0250464 | A1 | 12/2004 | Rasmussen et al. |
| 2005/0014664 | A1 | 1/2005 | Nadolsky et al. |
| 2005/0060927 | A1 | 3/2005 | Murphy |
| 2005/0095545 | A1 | 5/2005 | Tischendorf |
| 2005/0123780 | A1 | 6/2005 | Seydel |
| 2005/0158679 | A1 | 7/2005 | Chen et al. |
| 2005/0269728 | A1 | 12/2005 | Roos |
| 2006/0236593 | A1 | 10/2006 | Cap |
| 2006/0272199 | A1 | 12/2006 | Licciardello et al. |
| 2006/0272200 | A1 | 12/2006 | Murphy et al. |
| 2007/0006521 | A1 | 1/2007 | Licciardello et al. |
| 2007/0006522 | A1 | 1/2007 | Tao |
| 2007/0039237 | A1 | 2/2007 | Murphy et al. |
| 2007/0056211 | A1 | 3/2007 | Li et al. |
| 2007/0144058 | A1 | 6/2007 | Chen et al. |
| 2007/0151480 | A1 | 7/2007 | Bloom et al. |
| 2007/0270621 | A1 | 11/2007 | Millis et al. |
| 2007/0282000 | A1 | 12/2007 | Murphy et al. |
| 2008/0027194 | A1 | 1/2008 | Schrodi |
| 2008/0064891 | A1 | 3/2008 | Lee |
| 2008/0138753 | A1 | 6/2008 | Tao et al. |
| 2008/0145808 | A1 | 6/2008 | Lee |
| 2008/0206411 | A1 | 8/2008 | Nielsen |
| 2008/0307696 | A1 | 12/2008 | Wu et al. |
| 2009/0048459 | A1 | 2/2009 | Tupy et al. |
| 2009/0119977 | A1 | 5/2009 | Murphy |
| 2009/0217568 | A1 | 9/2009 | Murphy et al. |
| 2009/0259065 | A1 | 10/2009 | Abraham et al. |
| 2009/0264672 | A1 | 10/2009 | Abraham et al. |
| 2010/0024281 | A1 * | 2/2010 | Lemke et al. .................. 44/275 |
| 2010/0044924 | A1 | 2/2010 | Cap |
| 2010/0047499 | A1 | 2/2010 | Braksmayer et al. |
| 2010/0132250 | A1 | 6/2010 | Uptain et al. |
| 2010/0145086 | A1 | 6/2010 | Schrodi et al. |
| 2010/0205851 | A1 * | 8/2010 | Uptain et al. ................... 44/275 |
| 2010/0233146 | A1 * | 9/2010 | McDaniel .................... 424/94.2 |

FOREIGN PATENT DOCUMENTS

| | | | |
|---|---|---|---|
| EP | 0536861 | A1 | 4/1993 |
| EP | 0545715 | A1 | 6/1993 |
| EP | 0685554 | A1 | 12/1995 |
| EP | 0811664 | A1 | 12/1997 |
| EP | 1693436 | A1 | 8/2006 |
| EP | 1696022 | A1 | 8/2006 |
| EP | 1801096 | A1 | 6/2007 |
| EP | 1 935 971 | A1 | 6/2008 |
| JP | 56-032550 | A | 4/1981 |
| JP | 04-059897 | A | 2/1992 |
| JP | 06-009987 | A | 1/1994 |
| JP | 09-014574 | A | 1/1997 |
| WO | WO 92/00269 | | 1/1992 |
| WO | WO 96/00815 | A1 | 1/1996 |
| WO | WO 96/14373 | A1 | 5/1996 |
| WO | WO 98/45390 | A1 | 10/1998 |
| WO | WO 99/27043 | A1 | 6/1999 |
| WO | WO 02/30386 | A1 | 4/2002 |
| WO | WO 02/092736 | A1 | 11/2002 |
| WO | WO 03/012016 | A1 | 2/2003 |
| WO | WO 03/051134 | A2 | 6/2003 |
| WO | WO 03/057983 | A1 | 7/2003 |
| WO | WO 03/104348 | A1 | 12/2003 |
| WO | WO 2004/033388 | A1 | 4/2004 |
| WO | WO 2004/083310 | A1 | 9/2004 |
| WO | WO 2004/101720 | A1 | 11/2004 |
| WO | WO 2005/042655 | A2 | 5/2005 |
| WO | WO 2006/041011 | A1 | 4/2006 |
| WO | WO 2006/076364 | A2 | 7/2006 |
| WO | WO 2007/002999 | A1 | 1/2007 |
| WO | WO 2008/008420 | A1 | 1/2008 |
| WO | WO 2008/010961 | A2 | 1/2008 |
| WO | WO 2008/048520 | A2 | 4/2008 |
| WO | WO 2008/103289 | A1 | 8/2008 |
| WO | WO 2008/140468 | A2 | 11/2008 |

(56) References Cited

FOREIGN PATENT DOCUMENTS

| | | |
|---|---|---|
| WO | WO 2008/151064 A1 | 12/2008 |
| WO | WO 2008/157436 A1 | 12/2008 |
| WO | WO 2011/112486 A1 | 9/2011 |

OTHER PUBLICATIONS

Frahm, "Harvest Lights: The only soy-based candle, a bright idea," available at http://www.extension.uiuc.edu/~stratsoy/new/news/html/909166253,html, Oct. 23, 1998, 2 pages.
Mol, "Applications of Olefin Metathesis in Oleochemistry: An Example of Green Chemistry," Green Chemistry, Royal Society of Chemistry, Cambridge, GB, vol. 4, 2002, pp. 5-13.
Noller, Chemistry of Organic Compounds, W.B. Saunders Company, 2nd Ed., 1957, pp. 181 and 192.
Oliefabrik et al., "Paper coating", Research Disclosure Journal, Dec. 1996, 2 pages.
Orso, "New Use for Soybeans Has Bright Future," available at http://www.unitedsoybean.com/news/nr981014.htm, Oct. 14, 1998, 2 pages.
Rezaei, "Hydrogenated Vegetable Oils as Candle Wax," J. of the Am. Oil Chemists' Society, vol. 12, No. 79, pp. 1241-1247 (Dec. 2002).
Tao, "Development of Vegetable Lipid-based Candles," available at http://abe.www.ecn.purdue.edu/ABE/Research/research94/REPORT.94.Book_68.htmls, 1994, 2 pages.
In Business, "America's Shining Example of Sustainable Business," available at http://www.candleworks.org, Mar./Apr. 1998, 3 pages.
Pages from Bitter Creek Candle Supply, Inc., website (http://www.execpc.com/~bcsupply) now at http://www.candlesupply.com, available at least by Jun. 29, 2000, 9 pages.
Pages from Ecowax, Nature's Gift, Inc., website (http://nglwax.com/ecowax.htm), available at least by Jul. 5, 2000, 3 pages.
Pages from Heartland Candleworks website, available at www.candleworks.org, available at least by Feb. 11, 2000, 4 pages.
Purdue Agriculture News, Purdue May Agriculture & Natural Resources Package, available at http://purduenews.uns.purdue.edu/UNS/paks/agpak.digest.9605.html, May 1996, 3 pages.
Purdue News, "Purdue students put the 'happy' back into birthday candles," available at http://www.purdue.edu/UNS/html4ever/9611.Schweitzer.candles.html, Nov. 1996, 3 pages.
Purdue News, "Purdue students put the 'happy' back into birthday candles," available at http://www.purdue.edu/UNS/html4ever/9604.Schweitzer.candles.html, May 1996, 2 pages.
Purdue University School of Agriculture, 1998 Farm Progress Show, available at http://www.admin.ces.purdue.edu/anr/98fps/fpspix/930.html, 1998, 4 pages.

* cited by examiner

LIPID-BASED WAX COMPOSITIONS SUBSTANTIALLY FREE OF FAT BLOOM AND METHODS OF MAKING

CROSS REFERENCE TO RELATED APPLICATIONS

This application claims the benefit of U.S. Provisional Patent Application No. 61/416,586, filed Nov. 23, 2010, the disclosure of which is incorporated herein by reference.

BACKGROUND

For a long time, beeswax has been in common usage as a natural wax for candles. Over one hundred years ago, paraffin came into existence, in parallel with the development of the petroleum refining industry. Paraffin is produced from the residue leftover from refining gasoline and motor oils. Paraffin was introduced as a bountiful and low cost alternative to beeswax, which had become more and more costly and in more and more scarce supply.

Today, paraffin is the primary industrial wax used to produce candles and other wax-based products. Conventional candles produced from a paraffin wax material typically emit a smoke and can produce a bad smell when burning. In addition, a small amount of particles ("particulates") can be produced when the candle burns. These particles may affect the health of a human when breathed in. A candle that has a reduced amount of paraffin would be preferable.

Accordingly, it would be advantageous to have other materials that can be used to form clean burning base wax for forming candles. If possible, such materials would preferably be biodegradable and be derived from renewable raw materials, such as natural oil based materials. The candle base waxes should preferably have physical characteristics, e.g., in terms of melting point, hardness and/or malleability, that permit the material to be readily formed into candles having a pleasing appearance and/or feel to the touch, as well as having desirable olfactory properties.

Additionally, there are several types of candles, including taper, votive, pillar, container candles and the like, each of which places its own unique requirements on the wax used in the candle. For example, container candles, where the wax and wick are held in a container, typically glass, metal or the like, require lower melting points, specific burning characteristics such as wider melt pools, and should desirably adhere to the container walls. The melted wax should preferably retain a consistent appearance upon resolidification.

In the past, attempts to formulate candle waxes from natural oil-based materials have often suffered from a variety of problems. For example, relative to paraffin-based candles, natural oil-based candles have been reported to exhibit one or more disadvantages such as cracking, air pocket formation, and a natural product odor associated with vegetable oil materials such as soybean oil. Various soybean-based waxes have also been reported to suffer performance problems relating to optimum flame size, effective wax and wick performance matching for an even burn, maximum burning time, product color integration, and/or product shelf life. In order to achieve the aesthetic and functional product surface and quality sought by consumers of candles, it would be advantageous to develop new natural oil-based waxes that overcome as many of these deficiencies as possible.

There are fundamental differences in the inherent properties of the renewable, natural oil based saturated triglycerides when they are compared to the petroleum based straight chain aliphatic hydrocarbons that make up paraffin wax. Triglycerides exhibit well-documented polymorphic behavior whereas the aliphatic hydrocarbons of paraffin do not. "Polymorphism" means there are multiple crystal forms of the material that can (co)exist. In general, under rapid cooling, less stable lower melting and less molecularly dense crystals form initially, but given time and freeze-thaw cycles, the mobility of the molecules allow their rearrangement to higher melting, more stable and more molecularly dense crystal forms. This rearrangement can lead to the problems of cracking and blooming (i.e., "fat blooming") in a candle produced from natural oil based wax.

Fat blooming of a candle wax composition, as a consequence, results in a loss of sales and increased handling and production costs to the manufacturer. As a result, there is continuing interest in developing candle waxes substantially free of fat bloom from natural oils and natural oil derivatives.

SUMMARY

Compositions and related methods of making are disclosed for lipid-based wax compositions that are substantially free of fat bloom.

In one embodiment, the lipid-based wax composition substantially free of fat bloom comprises 0.1-10 percent by weight triacylglycerides, 30-95 percent by weight monoacylglycerides and diacylglycerides combined, and 0.1-65 percent by weight fatty acids. In this embodiment, the lipid-based wax composition is substantially free of fat bloom when formed by the process of (a) blending the monoacylglycerides, diacylglycerides, and triacylglycerides in the lipid-based wax composition by heating the lipid-based wax composition at a sufficiently high temperature to destroy substantially all crystal structure within the lipid-based wax composition, (b) pouring the lipid-based wax composition into a mold or a container having a surface and a core, wherein the pouring is conducted at a temperature at least 15° C. greater than the congeal point of the lipid-based wax composition, therein forming a molded wax; and (c) cooling the lipid-based wax composition under conditions sufficient to cool the core of the molded wax to at least 5° C. below the congeal point of the lipid-based wax composition in 30-90 minutes.

In another embodiment, the lipid-based wax composition substantially free of fat bloom comprises 2-5 percent by weight triacylglycerides, 30-40 percent by weight monoacylglycerides, 15-25 percent by weight diacylglycerides, and 35-45 percent by weight fatty acids. In this embodiment, the lipid-based wax composition is substantially free of fat bloom when formed by the process of (a) blending the monoacylglycerides, diacylglycerides, triacylglycerides, and fatty acid in the lipid-based wax composition by heating the lipid-based wax composition at a sufficiently high temperature to destroy substantially all crystal structure within the lipid-based wax composition, (b) pouring the lipid-based wax composition into a mold or a container having a surface, a core, and a wick disposed therein, wherein the pouring is conducted at a temperature at least 15° C. greater than the congeal point of the lipid-based wax composition, therein forming a molded wax, (c) cooling the lipid-based wax composition at a temperature between 18° C. and 33° C. to cool the core of the molded wax to at least 5° C. below the congeal point of the lipid-based wax composition in 30-90 minutes, wherein the cooling is conducted without the assistance of a fan; and (d) removing the lipid-based wax composition from the mold or leaving the lipid-based wax composition in the container as a candle.

In another embodiment, a method of making a lipid-based wax that is substantially free of fat bloom comprises providing 0.1-10 percent by weight triacylglycerides, 30-95 percent by weight monoacylglycerides and diacylglycerides combined, and 0.1-65 percent by weight fatty acids. The method further comprises blending the monoacylglycerides, diacylglycerides, triacylglycerides, and fatty acids in the lipid-based wax composition by heating the lipid-based wax composition at a sufficiently high temperature to destroy substantially all crystal structure within the lipid-based wax composition. The method further comprises pouring the lipid-based wax composition into a mold or a container having a surface and a core, wherein the pouring is conducted at a temperature at least 15° C. greater than the congeal point of the lipid-based wax composition, therein forming a molded wax. The method further comprises cooling the lipid-based wax composition under conditions sufficient to cool the core of the molded wax to at least 5° C. below the congeal point of the lipid-based wax composition in 30-90 minutes, wherein the lipid-based wax composition is substantially free of fat bloom.

DETAILED DESCRIPTION

As used herein, the singular forms “a,” “an,” and “the” include plural referents unless the context clearly dictates otherwise. For example, reference to “a substituent” encompasses a single substituent as well as two or more substituents, and the like.

As used herein, the terms “for example,” “for instance,” “such as,” or “including” are meant to introduce examples that further clarify more general subject matter. Unless otherwise specified, these examples are provided only as an aid for understanding the applications illustrated in the present disclosure, and are not meant to be limiting in any fashion.

As used herein, the following terms have the following meanings unless expressly stated to the contrary. It is understood that any term in the singular may include its plural counterpart and vice versa.

As used herein, the term “lipid-based wax compositions” may refer to compositions having at least one polyol fatty acid ester component. The polyol fatty acid ester component may include a partial fatty acid ester (or “polyol partial esters”) of one or more polyols and/or a polyol, which is fully esterified with fatty acids (“complete polyol fatty acid esters”). Examples of “complete polyol fatty acid esters” include triacylglycerides, propylene glycol diesters, and tetra esters of pentaerythritol. Examples of suitable “polyol partial esters” include monoacylglycerides, diacylglycerides, and sorbitan partial esters (e.g., diesters and triesters of sorbitan). In some embodiments, the polyol fatty acid ester may include from 2 to 6 carbon atoms and 2 to 6 hydroxyl groups. Examples of suitable polyol fatty acid esters include glycerol, trimethylolpropane, ethylene glycol, propylene glycol, pentaerythritol, sorbitan and sorbitol. In certain embodiments, monoacylglycerides are compounds made up of a glycerol and a fatty acid bound as an ester. Diacylglycerols are compounds made up of a glycerol and two fatty acids; each fatty acid is bound to the glycerol as an ester. Triacylglycerides are compounds made up of a glycerol and three fatty acids, each fatty acid is bound to the glycerol as an ester. Fatty acids in the polyol esters of a natural oil include saturated fatty acids, as a non-limiting example, palmitic acid (hexadecanoic acid) and stearic acid (octadecanoic acid), and unsaturated fatty acids, as a non-limiting example, oleic acid (9-octadecenoic acid), linoleic acid (9,12-octadecadienoic acid), and linolenic acid (9,12,15-octadecatrienoic acid).

In certain embodiments, the lipid-based wax composition is derived from natural oils. In certain embodiments, the lipid-based wax composition has a melting point between approximately 55° C. and approximately 75° C. In one embodiment, the wax has a melting point between approximately 57° C. and approximately 70° C. In another embodiment, the melting point is between approximately 57° C. and approximately 65° C. As used herein, the term “natural oil” may refer to oil derived from plants or animal sources. The term “natural oil” includes natural oil derivatives, unless otherwise indicated. Examples of natural oils include, but are not limited to, vegetable oils, algae oils, animal fats, tall oils, derivatives of these oils, combinations of any of these oils, and the like. Representative non-limiting examples of vegetable oils include canola oil, rapeseed oil, coconut oil, corn oil, cottonseed oil, olive oil, palm oil, peanut oil, safflower oil, sesame oil, soybean oil, sunflower oil, linseed oil, palm kernel oil, tung oil, jatropha oil, mustard oil, camelina oil, pennycress oil, hemp oil, algal oil, and castor oil. Representative non-limiting examples of animal fats include lard, tallow, poultry fat, yellow grease, and fish oil. Tall oils are by-products of wood pulp manufacture. In certain embodiments, the natural oil may be refined, bleached, and/or deodorized.

As used herein, the term “natural oil derivatives” may refer to the compounds or mixture of compounds derived from the natural oil using any one or combination of methods known in the art. Such methods include saponification, transesterification, esterification, interesterification, hydrogenation (partial or full), isomerization, oxidation, and reduction. Representative non-limiting examples of natural oil derivatives include gums, phospholipids, soapstock, acidulated soapstock, distillate or distillate sludge, fatty acids and fatty acid alkyl ester (e.g. non-limiting examples such as 2-ethylhexyl ester), hydroxy substituted variations thereof of the natural oil.

As used herein, the term “MAG” refers to monoacylglycerides and/or monoacylglyerols, the term “DAG” refers to diacylglycerides and/or diacylglycerols, and the term “TAG” refers to triacylglycerides and/or triacylglycerols.

As used herein, the term “fat bloom” may refer to the film that forms on the surface of the lipid-based wax composition (“surface fat bloom”) or in homogeneities of beta (β) phase crystals that resemble a loosely packed powder within the lipid-based wax composition (“internal fat bloom”). The principle of fat bloom is generally understood to be the transformation of a wax from a metastable phase to a more thermodynamically stable phase. Since fat bloom is a thermodynamically driven process, it will eventually occur in a lipid-based wax composition that is not in its most thermodynamically favored state, such as a wax composition in the beta prime (β) phase. Although the β' phase is not the most thermodynamically favored state, the composition of a candle can be designed such that the transformation of the wax from the β' phase to β phase is on the order of years instead of months or days. Fat bloom can also be exacerbated by storage of a candle at an elevated temperature, which can provide the necessary thermal energy for the lipid-based wax composition to undergo phase transformations. Fat crystals on the surface grow in size over time to first produce a dull appearance, with a white or light gray colored deposit on the surface, relative to what was once a glossy surface. Before the white deposit becomes visible, the product usually becomes dull and hazy having lost the high gloss surface. Although texture of the overall product may not be seriously altered by the early stages of fat bloom, the dull appearance and white deposit make it look old and stale to the consumer. Fat bloom may also exhibit itself as growths, which look like cauliflower, forming on the surface or interior of a candle, typically after burning it and then allowing the melt pool to re-solidify.

As used herein, the term "substantially free of fat bloom" may refer to a lipid-based wax composition that has little or no internal fat blooming or surface fat blooming and any observed fat blooming does not grow larger within a specified "shelf-life" after pouring the wax into a candle mold having an inner diameter of 3.5 inches and height of 3.75 inches and composed of blown glass (based on a Libbey's 16 oz blown glass), wherein the wax is poured at a temperature at least 15° C. greater than the congeal point of the wax, and wherein the core of the molded wax is cooled to at least 5° C. below the congeal point of the lipid-based wax within approximately 30-90 minutes of pouring and subsequently cooled at approximately room temperature. In certain embodiments, surface fat bloom in the candle may be determined by visual inspection by the naked eye or by x-ray diffraction. Additionally, in certain embodiments, internal fat bloom may be determined by visual inspection by the naked eye or by x-ray diffraction (after dividing the candle mold in half). With regards to inspection by x-ray diffraction, surface or internal fat blooming is determined by the intensity of the measured peaks at specific 2θ angles. In another embodiment, the lipid-based wax is substantially free of fat bloom when the cooling curve of the lipid-based wax shows substantially no exothermic peak during the first 30-90 minutes of cooling after being poured into a mold (i.e., when the lipid-based wax is blended at a temperature of approximately 75° C., and is moved to a cooling table at ambient temperature of approximately 24° C. (as further described in the Examples section below)).

As used herein, the term "microvoids" may refer to internal deformations or white spots that may form due to shrinkage of the composition material, wherein the deformations are not the result of a phase transformation but may be visually similar to internal fat blooms. In certain instances a lipid-based wax composition may be substantially free of fat bloom yet exhibit microvoids under visual inspection. The difference between microvoids and fat blooming may be observed with close visual inspection and/or microscopy. These microvoids may form at the hot spot of the lipid-based wax composition as it cools and their formation may be exacerbated when the wax is poured at temperatures just above its congeal point (e.g., approximately 59° C.). Therefore, in certain embodiments, pouring the lipid-based wax composition at a hotter temperature may reduce or eliminate the amount of microvoids formed.

As used herein, the term "shelf-life" refers to period the of time commencing with the pouring of the lipid-based wax composition into a candle mold to the point at which the candle mold develops visible surface or internal fat bloom. In certain embodiments, the shelf-life of the candle is at least one month, six months, one year, or two years when stored at a temperature of approximately 21° C. or less, approximately 27° C. or less, or approximately 32° C. or less.

As used herein, the term "accelerated bloom study" refers to determining whether or not the lipid-based wax exhibits surface or internal fat bloom by visual inspection after being exposed to an elevated temperature for a period of time. In other words, if the lipid-based wax composition is not comprised of a thermodynamically stable β' phase, it may develop fat blooming under the certain accelerated bloom conditions. In one embodiment, the lipid-based wax may be poured into two molds, each being approximately 7.62 centimeters in diameter, approximately 3.81 centimeters in height, and weighing approximately 100 grams; wherein the lipid-based wax composition is cooled at approximately 24° C. for at least 24 hours following the pouring, therein forming two candles; wherein the candles are then heated in an oven at 40.5° C.±0.5° C. for approximately 4 hours. In certain embodiments, the lipid-based wax composition will be substantially free of surface or internal fat bloom by visual inspection upon removal from the oven in either of the two molds.

As used herein, the term "congeal point" may refer to the highest temperature at which the mixture of wax compositions (such as a mixture of MAGs, DAGs, and TAGs) begins to solidify. The congeal point of the lipid-based wax composition may be determined by (1) melting the wax using either a hot plate or a 50:50 ethylene glycol:water mixture bath; (2) using a bulb thermometer (in either ° F. or ° C.), stirring the melted mixture until the mercury in the thermometer has stopped rising and remains level and record this temperature; (3) stirring the melt three more times with the thermometer; (4) after the third stir, removing the thermometer from the melt at a slight angle to retain a droplet on the end or side of the bulb; (5) once a droplet is obtained, orienting the thermometer in a horizontal position and begin rotating the thermometer outwards away from the body, wherein each rotation should be no more than a 3 count (3 seconds) or less than a 2 count (2 seconds); (6) continuing to rotate the droplet until the droplet begins to turn with the thermometer; (7) recording this temperature as quickly as possible; (8) repeating steps 2-7 until two temperatures are obtained that are within 2° C. of each other; wherein the average of the two temperatures is reported as the congeal point.

As used herein, the term "dropping point," "drop point," or "melting point" are synonymous and may refer to the temperature at which a mixture of lipid-based wax compositions (such as a mixture of monoacylglycerides, diacylglycerides, and triacylglycerides) begins to melt. The melting point may be measured using ASTM D127, incorporated herein by reference.

As used herein, "undercooling" refers to the rapid cooling or lowering of the core temperature of the lipid-based wax composition below the composition's congeal point. In certain embodiments, the degree of undercooling in making a candle from the lipid-based wax composition can impact the formation of fat blooming, especially when the melting temperature of one of the monoacylglyceride, diacylglyceride, or triacylglyceride components in the lipid-based wax composition is comparatively lower than the others.

Compositions of Lipid-Based Waxes Substantially Free of Fat Bloom

In certain embodiments, the lipid-based wax compositions commonly include a polyol fatty acid ester component (made up of partial and/or completely esterified polyols), at least a portion of which have been subjected to a transesterification reaction. The transesterification reaction may be catalyzed by an enzyme or by a chemical catalyst (e.g., a basic catalyst). As used herein, transesterification refers to a chemical reaction which results either in the exchange of an acyl group between two positions of a polyol polyester (any ester compound which contains more than one ester group, typically containing from 2 to 10 carbon atoms and from 2 to 6 hydroxyl groups) or of the exchange of an acyl group in one ester compound with an acyl group in a second ester compound or a carboxylic acid.

In certain embodiments, the polyol fatty acid ester component has been subjected to an interesterification reaction, e.g., by treatment with a basic catalyst, such as a sodium alkoxide. For example, the polyol ester component may include a polyol fatty acid ester component formed by a process that comprises interesterifying a polyol fatty acid ester precursor mixture. As used herein, the term "interesterified" refers to an ester composition which has been treated in a manner that results in the exchange of at least a portion of the acyl groups in the polyol esters present with other acyl groups, and/or other esters present. The interesterification of a mixture of completely esterified polyols may be conducted on a mixture which also includes one or more polyol partial esters, e.g., a fatty acid monoacylglyceride (MAG) and/or fatty acid diacylglycerides (DAG). Due to their desirable melting characteristics, in certain embodiments, the lipid-based wax has a melting point between approximately 55° C. and approximately 75° C., which can be particularly advantageous for use in forming candles. In other embodiments, the melting point is between approximately 57° C. and approximately 70° C., or between approximately 57° C. and approximately 65° C. Such waxes generally have an iodine values between approximately 0 and approximately 40.

In certain embodiments, the lipid-based wax compositions are derived from at least one natural oil. In certain embodiments, the natural oils are selected from the group consisting of canola oil, rapeseed oil, coconut oil, corn oil, cottonseed oil, olive oil, palm oil, peanut oil, safflower oil, sesame oil, soybean oil, sunflower oil, linseed oil, palm kernel oil, tung oil, jatropha oil, mustard oil, camellina oil, pennycress oil, hemp oil, algal oil, castor oil, lard, tallow, poultry fat, yellow grease, fish oil, tall oils, and mixtures thereof. In one embodiment, the MAGs, DAGs, and TAGs in the lipid-based wax compositions are derived from palm oil. In another embodiment, the MAGs, DAGs, and TAGs in the lipid-based wax compositions are derived from soybean oil. In another embodiment, the MAGs, DAGs, and TAGs in the lipid-based wax compositions are derived from coconut oil. In some embodiments, the MAGs, DAGs, and TAGs have carbon chain lengths between 8 and 22 carbon atoms.

In one embodiment, the source of TAGs in the lipid-based wax composition is S-155, sold by Elevance Renewable Sciences, Bolingbrook, Ill., USA. In another embodiment, the source of TAGs in the lipid-based wax is S-113, sold by Elevance Renewable Sciences, Bolingbrook, Ill., USA. In yet another embodiment, the source of TAGs in the lipid-based wax is S-130, sold by Elevance Renewable Sciences, Bolingbrook, Ill., USA. In certain embodiments, the source of TAGs may be refined, bleached, and/or deodorized.

Regarding the MAGs and DAGs, in certain embodiments, the source of MAGs in the lipid-based wax composition may be distilled monoacylglycerides such as Dimodan HSK, commercially available from Danisco Cultor USA, New Century, Kans., USA; Alphadim 90 PBK, commercially available from Caravan Ingredients, Lenexa, Kans., USA; or combinations thereof. In certain embodiments, the source of DAGs in the lipid-based wax compositions may be distilled diacylglyerides such Trancendim 110, Trancendim 120, or Trancendim 130, commercially available from Caravan Ingredients.

In another embodiment, the source of MAGs and DAGs is derived from Dur-Em™ 114, Dur-Em™ 117, Dur-Em™ 204, or Dur-Em™ 207, commercially available from Loders Croklaan, Channahon, Ill., USA; BFP 75, BFP 74, BFP 65, or BFP 64, commercially available from Caravan Ingredients; GRINDSTED® MONO-DI HP 60 commercially available from Danisco; or combinations thereof.

For the lipid-based wax compositions, surface and internal fat bloom in lipid-based waxes have been determined to be composition dependent. The combination of certain amounts of MAGs, DAGs, and TAGs can result in a lipid-based wax composition being substantially free of fat bloom over a period of time from the candle formation.

In certain embodiments, the lipid-based wax composition may include one or more fatty acids. In some embodiments, the fatty acid is derived from a natural oil such as canola oil, rapeseed oil, coconut oil, corn oil, cottonseed oil, olive oil, palm oil, peanut oil, safflower oil, sesame oil, soybean oil, sunflower oil, linseed oil, palm kernel oil, tung oil, jatropha oil, mustard oil, camellina oil, pennycress oil, hemp oil, algal oil, castor oil, lard, tallow, poultry fat, yellow grease, fish oil, tall oils, and mixtures thereof. In certain embodiments, the fatty acid is derived from palm oil, soybean oil, coconut oil, and mixtures thereof. In other embodiments, the fatty acid is selected from the group consisting of lauric acid, myristic acid, palmitic acid, stearic acid, arachidic acid, palmitoleic acid, oleic acid, gadoleic acid, linoleic acid, linolenic acid, tallow acids, and mixtures thereof.

In one embodiment, the fatty acid comprises a saturated aliphatic chain. In another embodiment, the fatty acid comprises an unsaturated aliphatic chain. In certain embodiments, the aliphatic chain comprises between 4 and 28 carbons.

In certain embodiments, the MAGs, DAGs, TAGs, and fatty acids in the lipid-based wax compositions are derived from palm oil, soybean oil, coconut oil, and mixtures thereof.

In certain embodiments, the lipid-based wax composition may include between approximately 0.1-10 percent by weight TAGs, approximately 1-8 percent by weight TAGs, or approximately 2-5 percent by weight TAGs. In other embodiments, the lipid-based wax composition may include between approximately 30-95 percent by weight MAGs and DAGs combined, approximately 40-80 percent by weight MAGs and DAGs combined, approximately 45-65 percent by weight MAGs and DAGs combined, or approximately 50-60 percent by weight MAGs and DAGs combined.

In certain embodiments, the lipid-based wax composition may include between approximately 5-65 percent by weight MAGs, approximately 15-55 percent by weight MAGs, approximately 25-45 percent by weight MAGs, or approximately 30-40 percent by weight MAGs. In yet other embodiments, the lipid-based wax composition may include between approximately 1-50 percent by weight DAGs, approximately 5-35 percent by weight DAGs, approximately 10-30 percent by weight DAGs, or approximately 15-25 percent by weight DAGs.

In certain embodiments, the lipid-based wax composition may include between approximately 0.1 percent by weight and approximately 65 percent by weight of a fatty acid. In another embodiment, the lipid-based wax may include between approximately 5 percent by weight and 60 percent by weight of a fatty acid. In another embodiment, the lipid-based wax may include between approximately 30 percent by weight and 50 percent by weight of a fatty acid. In yet another embodiment, the lipid-based wax may include between approximately 35 percent by weight and 45 percent by weight of a fatty acid.

In certain embodiments, the lipid-based wax composition substantially free of fat bloom has approximately 0.1-10 percent by weight TAGs; approximately 30-95 percent by weight MAGs and DAGs combined, and approximately 0.1-65 percent by weight fatty acid. In certain embodiments, the composition comprises between 5-65 percent by weight MAGs and between 1-50 percent by weight DAGs.

In other embodiments, the lipid-based wax composition substantially free of fat bloom has approximately 1-8 percent by weight TAGs, approximately 40-80 percent by weight MAGs and DAGs combined, and approximately 5-60 percent by weight fatty acid. In certain embodiments, the composition comprises between 15-55 percent by weight MAGs and between 5-35 percent by weight DAGs.

In another embodiment, the lipid-based wax composition substantially free of fat bloom has approximately 2-5 percent by weight TAGs, approximately 45-65 percent by weight MAGs and DAGs combined, and approximately 30-50 percent by weight fatty acid. In certain embodiments, the composition comprises between 25-45 percent by weight MAGs and between 10-30 percent by weight DAGs.

In one embodiment, the lipid-based wax composition substantially free of fat bloom has approximately 2-5 percent by weight TAGs, approximately 30-40 percent by weight MAGs, approximately 15-25 percent by weight DAGs, and approximately 35-45 percent by weight fatty acid.

Additives to the Lipid-Based Wax Compositions

In certain embodiments, the lipid-based wax composition may comprise at least one additive selected from the group consisting of: wax-fusion enhancing additives, coloring agents, scenting agents, migration inhibitors, surfactants, co-surfactants, emulsifiers, additional optimal wax ingredients, metals, and combinations thereof. In certain embodiments, the additive(s) may comprise upwards of approximately 30 parts by weight additive per 100 parts by weight of the lipid-based wax composition comprising MAGs, DAGs, TAGs, and fatty acids. In other embodiments, the additive may comprise upwards of approximately 5 parts by weight additive per 100 parts by weight of the lipid-based wax composition, or upwards of approximately 0.1 parts by weight additive per 100 parts by weight of the lipid-based wax composition.

In certain embodiments, the lipid-based wax composition can incorporate a wax-fusion enhancing type of additive selected from the group consisting of benzyl benzoate, dimethyl phthalate, dimethyl adipate, isobornyl acetate, cellulose acetate, glucose pentaacetate, pentaerythritol tetraacetate, trimethyl-s-trioxane, N-methylpyrrolidone, polyethylene glycols and mixtures thereof. In certain embodiments, the lipid-based wax composition comprises between approximately 0.1-5 parts by weight wax-fusion enhancing type additive per 100 parts by weight of the lipid-based wax.

In certain embodiments, one or more dyes or pigments (herein "coloring agents") may be added to the lipid-based wax composition to provide the desired hue to the candle. In certain embodiments, the lipid-based wax composition comprises between about approximately 0.001-2 parts by weight coloring agent per 100 parts by weight of the lipid-based wax. If a pigment is employed for the coloring agent, it is typically an organic toner in the form of a fine powder suspended in a liquid medium, such as a mineral oil. It may be advantageous to use a pigment that is in the form of fine particles suspended in a natural oil, e.g., a vegetable oil such as palm oil or soybean oil. The pigment is typically a finely ground, organic toner so that the wick of a candle formed eventually from pigment-covered wax particles does not clog as the wax is burned. Pigments, even in finely ground toner forms, are generally in colloidal suspension in a carrier.

A variety of pigments and dyes suitable for candle making are listed in U.S. Pat. No. 4,614,625, the disclosure of which is herein incorporated by reference in its entirety. In certain embodiments, the carrier for use with organic dyes is an organic solvent, such as a relatively low molecular weight, aromatic hydrocarbon solvent (e.g., toluene and xylene).

In other embodiments, one or more perfumes, fragrances, essences, or other aromatic oils (herein "scenting agent") may be added to the lipid-based wax composition to provide the desired odor to lipid-based wax composition. In certain embodiments, the lipid-based wax composition comprises between about approximately 1-15 parts by weight scenting agent per 100 parts by weight of the lipid-based wax. The coloring and scenting agents generally may also include liquid carriers that vary depending upon the type of color- or scent-imparting ingredient employed. In certain embodiments, the use of liquid organic carriers with coloring and scenting agents is preferred because such carriers are compatible with petroleum-based waxes and related organic materials. As a result, such coloring and scenting agents tend to be readily absorbed into the lipid-based wax composition material.

In certain embodiments, the scenting agent may be an air freshener, an insect repellent, or mixture thereof. In certain embodiments, the air freshener scenting agent is a liquid fragrance comprising one or more volatile organic compounds, including those commercially available from perfumery suppliers such as: IFF, Firmenich Inc., Takasago Inc., Belmay, Symrise Inc, Noville Inc., Quest Co., and Givaudan-Roure Corp. Most conventional fragrance materials are volatile essential oils. The fragrance can be a synthetically formed material, or a naturally derived oil such as oil of bergamot, bitter orange, lemon, mandarin, caraway, cedar leaf, clove leaf, cedar wood, geranium, lavender, orange, origanum, petitgrain, white cedar, patchouli, lavandin, neroli, rose, and the like.

In other embodiments, the scenting agent may be selected from a wide variety of chemicals such as aldehydes, ketones, esters, alcohols, terpenes, and the like. The scenting agent can be relatively simple in composition, or can be a complex mixture of natural and synthetic chemical components. A typical scented oil can comprise woody/earthy bases containing exotic constituents such as sandalwood oil, civet, patchouli oil, and the like. A scented oil can have a light floral fragrance, such as rose extract or violet extract. Scented oil also can be formulated to provide desirable fruity odors, such as lime, lemon, or orange.

In yet other embodiments, the scenting agent can comprise a synthetic type of fragrance composition either alone or in combination with natural oils such as described in U.S. Pat. Nos. 4,314,915; 4,411,829; and 4,434,306; incorporated herein by reference in their entirety. Other artificial liquid fragrances include geraniol, geranyl acetate, eugenol, isoeugenol, linalool, linalyl acetate, phenethyl alcohol, methyl ethyl ketone, methylionone, isobornyl acetate, and the like. The scenting agent can also be a liquid formulation containing an insect repellent such as citronellal, or a therapeutic agent such as eucalyptus or menthol.

In certain embodiments, a "migration inhibitor" additive may be included in the lipid-based wax composition to decrease the tendency of colorants, fragrance components, and/or other components of the wax from migrating to the outer surface of a candle. In certain embodiments, the migration inhibitor is a polymerized alpha olefin. In certain embodiments, the polymerized alpha olefin has at least 10 carbon atoms. In another embodiment, the polymerized alpha olefin has between 10 and 25 carbon atoms. One suitable example of such a polymer is a hyper-branched alpha olefin polymer sold under the trade name Vybar® 103 polymer (mp 168° F. (circa 76° C.); commercially available from Baker-Petrolite, Sugarland, Tex., USA).

In certain embodiments, the inclusion of sorbitan triesters, such as sorbitan tristearate and/or sorbitan tripalmitate, and related sorbitan triesters formed from mixtures of fully hydrogenated fatty acids, and/or polysorbate triesters or monoesters such as polysorbate tristearate and/or polysorbate tripalmitate and related polysorbates formed from mixtures of fully hydrogenated fatty acids and/or polysorbate monostearate and/or polysorbate monopalmitate and related polysorbates formed from mixtures of fully hydrogenated fatty acids in the lipid-based wax composition may also decrease the propensity of colorants, fragrance components, and/or other components of the wax from migrating to the candle surface. The inclusion of either of these types of migration inhibitors can also enhance the flexibility of the lipid-based wax composition and decrease its chances of cracking during the cooling processes that occurs in candle formation and after extinguishing the flame of a burning candle.

In certain embodiments, the lipid-based wax composition may include between approximately 0-1-5.0 parts by weight migration inhibitor (such as a polymerized alpha olefin) per 100 parts by weight of the lipid-based wax. In another embodiment, the lipid-based wax composition may include between approximately 0.1-2.0 parts by weight migration inhibitor per 100 parts by weight of the lipid-based wax.

In another embodiment, the lipid-based wax composition may include an additional optimal wax ingredient, including without limitation, creature waxes such as beeswax, lanolin, shellac wax, Chinese insect wax, and spermaceti, various types of plant waxes such as carnauba, candelila, Japan wax, ouricury wax, rice-bran wax, jojoba wax, castor wax, bayberry wax, sugar cane wax, and maize wax), and synthetic waxes such as polyethylene wax, Fischer-Tropsch wax, chlorinated naphthalene wax, chemically modified wax, substituted amide wax, alpha olefins and polymerized alpha olefin wax. In certain embodiments, the lipid-based wax composition may include upward of approximately 25 parts by weight of the additional optimal wax ingredient per 100 parts by weight of the lipid-based wax. In other embodiments, the composition may include upward of approximately 10 parts by weight additional optimal wax ingredient per 100 parts by weight of the lipid-based wax, or upward of approximately 1 part by weight additional optimal wax ingredient per 100 parts by weight of the lipid-based wax.

In certain embodiments, the lipid-based wax composition may include a surfactant. In certain embodiments, the lipid-based wax composition may include upward of approximately 25 parts by weight surfactant per 100 parts by weight of the lipid-based wax, upward of approximately 10 parts by weight surfactant per 100 parts by weight of the lipid-based wax, or upward of approximately 1 part by weight surfactant per 100 parts by weight of the lipid-based wax. A non-limiting listing of surfactants includes: polyoxyethylene sorbitan trioleate, such as Tween 85, commercially available from Acros Organics; polyoxyethylene sorbitan monooleate, such as Tween 80, commercially available from Acros Organics and Uniqema; sorbitan tristearate, such as DurTan 65, commercially available from Loders Croklann, Grindsted STS 30 K commercially available from Danisco, and Tween 65 commercially available from Acros Organics and Uniqema; sorbitan monostearate, such as Tween 60 commercially available from Acros Organics and Uniqema, DurTan 60 commercially available from Loders Croklann, and Grindsted SMS, commercially available from Danisco; Polyoxyethylene sorbitan monopalmitate, such as Tween 40, commercially available from Acros Organics and Uniqema; and polyoxyethylene sorbitan monolaurate, such as Tween 20, commercially available from Acros Organics and Uniqema.

In additional embodiments, an additional surfactant (i.e., a "co-surfactant") may be added in order to improve the microstructure (texture) and/or stability (shelf life) of emulsified lipid-based wax compositions. In certain embodiments, the lipid-based wax composition may include upward of approximately 5 parts by weight of a co-surfactant per 100 parts by weight of the lipid-based wax. In another embodiment, the lipid-based wax composition may include upward of approximately 0.1 parts by weight of a co-surfactant per 100 parts by weight of the lipid-based wax.

In certain embodiments, the lipid-based wax composition may include an emulsifier. In certain embodiments, the emulsifier is the combination of MAGs and DAGs in the lipid-based wax composition. Emulsifiers for lipid-based waxes are commonly synthesized using a base-catalyzed process, after which the emulsifiers may be neutralized. In certain embodiments, the emulsifier may be neutralized by adding organic acids, inorganic acids, or combinations thereof to the emulsifier. Non-limiting examples of organic and inorganic neutralization acids include: citric acid, phosphoric acid, hydrochloric acid, nitric acid, sulfuric acid, lactic acid, oxalic acid, carboxylic acid, as well as other phosphates, nitrates, sulfates, chlorides, iodides, nitrides, and combinations thereof.

Certain neutralization acids may reduce the performance of the lipid-based wax composition to unacceptable levels (specifically with regards to consumption rate and size of the melt pool as well as the color of the wax and smoking times) if their concentrations are too high. Not all acids or inorganic complexes will affect candle performance in the same way. In certain embodiments, the addition of too much phosphoric acid can lead to wick brittleness and wick clogging which can result in low consumption rates and diminished size of the candle melt pool. In other embodiments, the addition of too much citric acid can lead to unacceptable smoking times, browning of the wax, and can also result in undesirable color changes to the wax over a period of months after the candles are poured. Care should be taken to control the type and concentration of acids and inorganic complexes that are added to neutralize the emulsifier used in the candle composition. Ideally, the effective concentration of acids and bases in the lipid-based wax composition should be stoichiometrically equal to help avoid burn performance issues.

In certain embodiments, the lipid-based wax composition comprises MAGs and DAGs having an organic acid (such as citric acid, lactic acid, oxalic acid, carboxylic acid, or mixtures thereof), wherein the concentration of organic acid is less than approximately 500 ppm, less than approximately 300 ppm, or less than approximately 100 ppm in the MAGs and DAGs combined. In another embodiment, the lipid-based wax composition comprises MAGs and DAGs having a residual inorganic complex (such as phosphates, nitrates, sulfates, chlorides, bromides, iodides, nitrides, or mixtures thereof), wherein the concentration of the residual inorganic complex is less than approximately 15 ppm, less than approximately 10 ppm, or less than approximately 5 ppm in the MAGs and DAGs combined.

In certain embodiments, metals may be added to the lipid-based wax composition, often in the form of counter ions for bases that are used to base-catalyze esterification reactions such as transesterification and/or interesterification. In certain embodiments, these metals may be selected from a group composed of alkali metals, alkali earth metals, transition metals, rare earth metals, and combinations thereof. In certain embodiments, the addition of too much of a metal additive may affect the coloration and/or burn performance of candles made from the lipid-based wax composition by causing wick clogging, irregular flames and/or flame heights, poor fragrance interactions, or combinations of these issues. Therefore, in certain embodiments, the lipid-based wax may include less than approximately 100 parts per million, less than approximately 25 parts per million, or less than approximately 5 parts per million of these metals.

Candle Formation

Candles can be produced using a number of different methods. In one process, the lipid-based wax composition is blended and heated to a molten state. In certain embodiments, the MAGs and DAGs in the lipid-based wax composition are blended together to form a mixture of MAGs and DAGs, followed by blending the mixture of MAGs and DAGs with the TAGs and fatty acid. In some embodiments, before blending with the TAGs and fatty acid, the mixture of MAGs and DAGs are distilled. In other embodiments, the mixture of MAGs and DAGs are at least partially interesterified prior to blending with the TAGs and fatty acid.

Regarding the heating of the lipid-based wax composition, the temperature needed to achieve this molten state should be sufficient to destroy any crystal structure within the lipid-based wax composition. In certain embodiments, the lipid-based wax composition is heated to a temperature greater than the congeal point of the lipid-based wax composition. In certain embodiments, the temperature is greater than approximately 65° C., 70° C., or 75° C. If additives (such as colorants and/or fragrance oils) are to be included in the candle formulation, these may be added to the molten wax or mixed with lipid-based wax prior to heating.

The molten wax is then solidified. For example, the molten wax can be poured into a mold or container. In certain embodiments, the molten wax is poured into a mold or container while the wax is at a temperature greater than the congeal point of the lipid-based wax composition. In certain embodiments, the molten wax is poured at a temperature at least 5° C., 10° C., 15° C., or 20° C. greater than the congeal point of the lipid-based wax composition.

In certain embodiments, the molten wax is poured into a mold or container that includes a candlewick. In other embodiments, the molten wax is poured into a mold or container that does not include a candlewick. In certain embodiments, the container is larger than about three inches (or about 7.5 centimeters) in diameter, or larger than about four inches (or about 10.2 centimeters) in diameter, or larger than about six inches (or about 15 centimeters) in diameter.

In certain embodiments, the molten wax is then cooled on a typical industrial line to solidify the wax in the shape of the mold or container. In certain embodiments, the "undercooling" conditions described below are used to cool the wax. In some embodiments, an industrial line would consist of a conveyor belt, with an automated filling system that the candles may travel on, and may also incorporate the use of fans to speed up the cooling of the candles on the line. Depending on the type of candle being produced, the candle may be unmolded or used as a candle while still in the mold. Where the candle is designed to be used in unmolded form, it may also be coated with an outer layer of higher melting point material. In some embodiments, the aforementioned cooling of the molten wax can be accomplished by passing the molten wax through a swept-surface heat exchanger, as described in U.S. Patent Application No. 2006/0236593, which is incorporated by reference in its entirety. A suitable swept-surface heat exchanger is a commercially available Votator A Unit, described in more detail in U.S. Pat. No. 3,011,896, which is incorporated by reference in its entirety.

Alternatively, the lipid-based wax can be formed into a desired shape, e.g., by pouring molten lipid-based wax into a mold and removing the shaped material from the mold after it has solidified. A wick may be inserted into the shaped waxy material using techniques known to those skilled in the art, e.g., using a wicking machine such as a Kurschner wicking machine.

Lipid-based wax compositions can also be formed into candles using compression molding techniques. This process often involves forming the wax into a particulate form and then introducing the particulate wax into a compression mold. Lipid-based wax compositions can also be formed into candles using extrusion molding techniques. This process often involves forming the wax into a particulate form and then introducing the particulate wax into an extrusion system.

As discussed above, in certain embodiments, the lipid-based wax composition can include a coloring or scenting agent. In certain embodiments, one or more dyes or pigments is added to the lipid-based wax composition to provide the desired hue to the color agent. In other embodiments, one or more perfumes, fragrances, essences, or other aromatic oils is added to the lipid-based wax composition to provide the desired odor to the scenting agent. The coloring and scenting agents generally also include liquid carriers that vary depending upon the type of color- or scent-imparting ingredient employed. The use of liquid organic carriers with coloring and scenting agents is preferred because such carriers are compatible with petroleum-based waxes and related organic materials. As a result, such coloring and scenting agents tend to be readily absorbed into the lipid-based wax composition. If a dye constituent is utilized, it may be dissolved in an organic solvent.

In certain embodiments, once the coloring and scenting agents have been formulated, the desired quantities are combined with lipid-based wax composition that will be used to form the body of the candle. When both coloring and scenting agents are employed, it is generally preferable to combine the agents together and then add the resulting mixture to the wax. It is also possible, to add the agents separately to the lipid-based wax composition. Having added the agent or agents to the wax, the granules are coated by agitating the wax particles and the coloring and/or scenting agents together. The agitating step commonly consists of tumbling and/or rubbing the particles and agent(s) together. Preferably, the agent or agents are distributed substantially uniformly among the particles of wax, although it is entirely possible, if desired, to have a more random pattern of distribution. The coating step may be accomplished by hand, or with the aid of mechanical tumblers and agitators when relatively large quantities of wax are being colored and/or scented.

Additional additives may be added during the forming of the lipid-based wax composition, including migration inhibitors, additional optimal wax ingredients, surfactants, co-surfactants, emulsifiers, metals, and combinations thereof, as mentioned above.

In certain embodiments, when adding multiple surfactants to the lipid-based wax composition, improved wax properties are most often achieved by combining two or more surfactants belonging to the same type but differing in hydrophilic-lipophilic balance (HLB), so that an oil-in water emulsion may change into a water-in oil emulsion as smoothly as possible, or the maximum amount of the dispersed phase remains soluble as storage or working conditions vary (e.g., temperature, shearing rate). However, sometimes even the use two surfactants fails to provide the stability demanded by manufacturers or consumers. Thus, in certain embodiments, fatty alcohols, when combined with certain non-ionic surfactants (e.g., polyols, polyethers, polyesters, glycosides, etc.) can maximize the stability of such compositions by creating a micro-emulsion (i.e., a thermodynamically stable emulsion). Fatty alcohols can also clarify formulations that tend to remain turbid at typical molten storage temperatures by raising the critical micelle concentration (cloud point or CMC) and/or the critical micelle temperature (Krafft point or CMT) of MAGs and/or the added surfactant(s). In addition, fatty alcohol co-surfactants may optimize the microstructure of lipid-based wax compositions by ensuring that the processes of crystal nucleation and crystal growth remain balanced during candle production. Fatty alcohol co-surfactants may accomplish this process by reducing the viscosity of emulsified formulations. The rate of crystal growth (transfer of wax molecules or colloidal particles from the melt onto the face of nuclei) is directly proportional to the rate of diffusion, and the rate of diffusion is inversely proportional to viscosity (according to Stokes' Law), reducing the viscosity of such formulations encourages the formation of fat crystal networks (flocculated colloidal particles).

Undercooling

After the lipid-based wax composition is poured into a mold, the wax may be cooled under certain conditions described as "undercooling." The degree of undercooling can be an important aspect in making a candle from the lipid-based wax composition if the melting temperature of one of the MAG, DAG, or TAG components in the wax composition is comparatively lower than the others. In certain embodiments, the cooling regime of the lipid-based wax composition can result in an alteration of the crystallization process. In other words, it is possible for the β' phase of the wax composition to form directly during cooling of the lipid-based wax composition. However, in certain embodiments, the β phase may form directly when there is still a memory effect in the wax (i.e., the wax has not been heated sufficiently to completely melt all β crystal structure). Therefore, in certain embodiments, it is necessary to begin the cooling process (i.e., pour the wax composition) at a temperature greater than the melting point of the wax based composition to completely melt all β crystal structure. Moreover, if the degree of undercooling is not large enough, transformation to the phase becomes difficult to avoid due to high temperature and time forces.

Crystallization of any substance takes place as a result of two mechanisms: nucleation and crystal growth. Nucleation involves the initial formation of tiny embryonic crystals referred to as nuclei. Crystal growth is the development of the nuclei into larger crystals. Referring to lipid-based wax crystallization, crystal growth involves the diffusion of acylglycerides from the bulk solution and subsequent incorporation into the crystal lattice structure of an existing crystal or nucleus.

The rate of nucleation increases with the degree of undercooling (i.e., with decreasing temperature), which is the energetic driving force for the phase change. The rate of crystal growth, on the other hand, is also related to molecular mobility (i.e., kinetic energy) and therefore can increase with increasing temperatures achieving a maximum rate of growth at temperatures just below the melting point of the crystal being formed. Therefore the cooling conditions used will dictate both the number of nucleation sites created as well as their rate of growth. The interaction of these two modes of crystallization determines the structure and stability of the fat phase in the wax. It is believed that this defines the performance and acceptability of the wax and its characteristics including fat bloom resistance.

In certain embodiments, the undercooling of the lipid-based wax composition is conducted at a temperature below the congeal temperature of the wax. The process begins at a temperature proximate to the molten state of the lipid-based wax composition and is then rapidly cooled at a temperature below the congeal temperature of the lipid-based wax composition. In one embodiment, the rapid cooling process begins at a temperature above approximately 65° C. (or above the congeal point temperature of the lipid-based wax composition). In one embodiment, the core temperature of the wax is lowered to a temperature that is approximately 5° C. below the congeal temperature of the lipid-based wax composition. In another embodiment, the core temperature of the wax is lowered to a temperature at least approximately 10° C. below the congeal temperature of the lipid-based wax composition.

In certain embodiments, the undercooling time period for candle formation is less than approximately 90 minutes, i.e., the core temperature of the candle is lowered to a temperature at least approximately 5° C. (or at least approximately 10° C.) less than the congeal temperature of the lipid-based wax in 90 minutes. In other embodiments, the undercooling period for candle formation is less than approximately 60 minutes, i.e., the core temperature of the candle is lowered to a temperature at least approximately 5° C. (or at least approximately 10° C.) less than the congeal temperature of the lipid-based wax in 60 minutes. In yet other embodiments, the undercooling period is less than approximately 40 minutes. In further embodiments, the undercooling period is less than about 30 minutes. In the above embodiments, the lipid-based wax composition after this undercooling period is substantially free of fat bloom.

In certain embodiments, the undercooling of the lipid-based wax composition is conducted at a temperature between approximately 18° C. and approximately 33° C., between approximately 20° C. and approximately 30° C., between approximately 20° C. and approximately 25° C., or between approximately 25° C. and approximately 30° C.

Further, the cooling rate of the wax can be as slow as approximately 0.3° C. per minute (and in some embodiments as slow as approximately 0.27° C. per minute) without showing an exothermic peak at the core (or slowest cooling region of the product, also referred to as the "hot spot"). As a non-limiting example, for a 400 gram sample poured into a Libbey's 16 oz blown glass tumbler, the hot spot may be located in the center of the sample horizontally and 3 cm below the top surface of the wax vertically. An exothermic peak in the cooling curve usually indicates the formation of the more stable, but less desirable β phase of the wax. Therefore, in certain embodiments, it is desirable to produce a wax that has a cooling profile without an exothermic peak in the first 90 minutes (and in some embodiments, 60 minutes, 40 minutes, or 30 minutes) of cooling after being poured. A wax sample that exhibits this characteristic while cooled under the preceding conditions should be composed primarily of the preferred 13' phase.

In certain embodiments, the lipid-based wax composition may be cooled during the first 30-90 minutes of cooling after being poured without the assistance of a fan. In other embodiments, the lipid-based wax composition may be cooled during the first 30-90 minutes of cooling after being poured with the assistance of a fan.

In certain embodiments, after the cooling, the lipid-based wax composition may be removed from the mold or is left in the container as a candle.

In one embodiment, the lipid-based wax composition substantially free of fat bloom exhibits stability against phase transformation for at least one year when stored at or below about 21° C. following the cooling of the lipid-based wax composition. In another embodiment, the lipid based wax composition substantially free of fat bloom exhibits stability against phase transformation for at least one year when stored at or above below 27° C. following the cooling of the lipid-based wax composition. In another embodiment, the lipid-based wax composition substantially free of fat bloom exhibits stability against phase transformation for at least one year when stored at or below about 32° C. following the cooling of the lipid-based wax composition.

In certain embodiments, the lipid-based wax composition will be substantially free of surface or internal fat bloom following an "accelerated bloom study."

In one embodiment, the accelerated bloom study comprises pouring the lipid-based wax into two molds, each being approximately 7.62 centimeters in diameter, approximately 3.81 centimeters in height, and weighing approximately 100 grams; wherein the lipid-based wax composition is cooled at approximately 24° C. for at least 24 hours following the pouring, therein forming two candles; wherein the candles are then heated in an oven at 40.5° C.±0.5° C. for approximately 4 hours. In certain embodiments, the lipid-based wax composition will be substantially free of surface or internal fat bloom by visual inspection upon removal from the oven in either of the two molds.

Improved Burn Diameters

In certain embodiments, a candle formed from a lipid-based wax composition comprising MAGs, DAGs, TAGs, and fatty acids (in the weight % ranges discussed above) has an increased burn diameter over a candle wax composition not having the composition of MAGs, DAGs, TAGs, and fatty acid (e.g., not having a fatty acid). In certain embodiments, a candle formed from a lipid-based wax composition comprising MAGs, DAGs, TAGs, and fatty acids has an increased burn diameter and acceptable melt point over a candle wax composition not having a fatty acid. In some embodiments, when the lipid-based wax composition comprising MAGs, DAGs, TAGs, and fatty acids is formed into a candle, the candle has a burn diameter that is approximately the width of the candle diameter (>80%, >90%, or >95% of the width of the candle diameter) after the candle has been burning for approximately 4 hours. In certain embodiments, the candle diameter is between approximately 50 mm and approximately 100 mm. In one embodiment, the candle diameter is approximately 75 mm.

In one particular embodiment, when the lipid-based wax composition is poured into a candle mold approximately 76.2 millimeters in diameter and 88.9 millimeters in height, the candle has a rate of consumption between approximately 3-4 g/hr, and a burn diameter of at least 70 millimeters after burning for 4 hours.

While the invention as described may have modifications and alternative forms, various embodiments thereof have been described in detail. It should be understood, however, that the description herein of these various embodiments is not intended to limit the invention, but on the contrary, the intention is to cover all modifications, equivalents, and alternatives falling within the spirit and scope of the invention as defined by the claims. Further, while the invention will also be described with reference to the following non-limiting examples, it will be understood, of course, that the invention is not limited thereto since modifications may be made by those skilled in the art, particularly in light of the foregoing teachings.

EXAMPLES

Candle molds comprising lipid-based wax compositions having MAGs, DAGs, TAGs, and/or fatty acids were prepared and tested. The samples are disclosed below in the Table. In this study, samples were made in an aluminum mold having a diameter of approximately 76.2 mm (3 inches) and a height of approximately 88.9 mm (3.5 inches). The lipid-based wax compositions were heated to approximately 74° C. (165° F.). Fragrances and dyes were then added to the wax compositions. The aluminum molds were pre-heated to approximately 71° C. (160° F.). The waxes were poured and allowed to cool (with or without using fans for cooling). The candles were then removed from the molds and holes were drilled into the centers, wherein wicks were inserted. Each sample was burned and observed for its rate of consumption (g/hr) and diameter of burn (mm).

In these compositions, Dur-Em™ 207 (commercially available from Loders Croklaan, Channahon, Ill., USA) is a source of MAGs, DAGs, and TAGs comprising approximately 57 wt % MAG, 32 wt % DAG, and 7 wt % TAG. Dur-™ 114 also comprises approximately 57 wt % MAG, 32 wt % DAG, and 7 wt % TAG. SC 123 (commercially available from Cargill, Inc., Minneapolis, Minn., USA), comprises approximately 100 wt % TAG.

TABLE

| Blend Comp. | Ex 1 wt % | Ex 2 wt % | Ex 3 wt % | Ex 4 wt % | Ex 5 wt % | Ex 6 wt % | Ex 7 wt % | Ex 8 wt % | Ex 9 wt % |
|---|---|---|---|---|---|---|---|---|---|
| Dur-Em ™ 207 | 100 | 85 | 80 | 80 | 70 | 72.25 | 63.75 | 50 | 60 |
| Dur-Em ™114 | | 15 | 20 | | | 12.75 | 11.25 | 10 | |
| SC 123 | | | | 20 | 30 | | | | |
| Palm Fatty Acid | | | | | | 15 | 25 | 40 | 40 |
| Melt Point (° C.) | 62.8 | 60.3 | 59.3 | 61.2 | 59.4 | 60.4 | 60.3 | 60.4 | 61.8 |
| Iodine Value | 1.1 | 9.9 | 12.9 | 11.9 | 17.3 | 8.6 | 7.6 | 6.8 | 1.1 |
| Rate of Consumption (g/hr) | 3.59 | 3.81 | 3.69 | 3.53 | 3.62 | 3.59 | 3.68 | 3.89 | 3.52 |
| Diameter of burn (mm) | 30 | 47 | 52 | 58 | 61 | 71 | 71 | 71 | 71 |

It was observed that the rate of consumption for Examples 1-9 varied between 3.52-3.89 g/hr. While all of the Examples had similar rates of consumption, the burn diameters varied depending on what was in the blend composition. Compositions made mostly from MAGs and DAGs (Examples 1-3) tended to struggle to burn a very large diameter in the candle. The addition of a TAG (Examples 4-5) tended to help increase the burn diameter, but as more of the softer TAG was added, the lower the melt point of the wax became. With the addition of a fatty acid (Examples 6-9), the burn diameter was increased to approximately the width of the candle while keeping the melt point of the composition in an acceptable range. In other words, the addition of a fatty acid to the lipid-based wax composition improved the burn characteristics of the candle. In these examples, the addition of 15 percent (Example 6) by weight palm fatty acid was sufficient to improve the burn diameter to approximately the width of the candle.

What is claimed is:

1. A method of making a composition comprising:

providing a lipid-based wax composition, wherein the lipid-based wax composition comprises greater than or equal to 0.1 and less than 5 percent by weight triacylglycerides, greater than 45 and less than or equal to 95 percent by weight monoacylglycerides and diacylglycerides combined, and 0.1-50 percent by weight free fatty acids, and wherein the triacylglycerides, the monoacylglycerides and diacylglycerides, and the free fatty acids make up 100 percent of the lipid-based wax composition;

heating the lipid-based wax composition to a temperature that is at least 15° C. greater than its congeal point;

optionally adding at least one additive to the blended lipid-based wax composition, wherein, upon addition, the at least one additive makes up no more than 30 percent by weight of the blended lipid-based wax composition;

pouring the blended lipid-based wax composition and the at least one additive, if present, into a mold or a container having a surface and a core, wherein the pouring is conducted at a temperature that is at least 15° C. greater than its congeal point to form a molded wax;

cooling the molded wax at a rate such that the core of the molded wax reaches a temperature that is at least 5° C. below its congeal point within 30-90 minutes of the pouring.

2. The method of claim 1, wherein the cooling comprises exposing the molded wax to an environment having a temperature between 18° C. and 33° C.

3. The method of claim 1 further comprising removing the molded wax from the mold or leaving the composition in the container as a candle.

4. The method of claim 1 further comprising inserting a wick in the mold or container prior to or during the pouring of the composition.

5. The method of claim 1, wherein the cooling is conducted without the assistance of a fan.

6. The method of claim 1, wherein the cooling is conducted with the assistance of a fan.

7. The method of claim 1, wherein the pouring comprises pouring the blended lipid-based wax composition and the at least one additive, if present, into a container having a surface and a core, wherein the container is a cylinder having a diameter that is greater than 7.5 centimeters.

8. The method of claim 7, wherein the container is a cylinder having a diameter that is greater than 15 centimeters.

9. The method of claim 1, wherein the cooling is carried out at a cooling rate as slow as 0.27° C. per minute during the first 90 minutes after pouring.

10. The method of claim 1, wherein the lipid-based wax composition comprises:

greater than or equal to 1 and less than 5 percent by weight of the triacylglycerides;

greater than 45 and less than or equal to 80 percent by weight of the monoacylglycerides and diacylglycerides combined; and 5-50 percent by weight of the free fatty acids.

11. The method of claim 1, wherein the lipid-based wax composition comprises:

greater than or equal to 2 and less than 5 percent by weight of the triacylglycerides;

greater than 45 and less than or equal to 65 percent by weight of the monoacylglycerides and diacylglycerides combined; and 30-50 percent by weight of the free fatty acids.

12. The method of claim 1, wherein the lipid-based wax composition comprises:

25-45 percent by weight of the monoacylglycerides; and 10-30 percent by weight of the diacylglycerides, wherein the monoacylglycerides and the diacylglycerides combined is greater than at least 45 percent by weight of the lipid-based wax composition.

13. The method of claim 1, wherein the lipid-based wax composition comprises:

greater than or equal to 2 and less than 5 percent by weight of the triacylglycerides;

30-40 percent by weight of the monoacylglycerides;

15-25 percent by weight of the diacylglycerides; and 35-45 percent by weight of the free fatty acids, wherein the monoacylglycerides and the diacylglycerides combined is greater than at least 45 percent by weight of the lipid-based wax composition.

14. The method of claim 1, wherein the monoacylglycerides, the diacylglycerides, the triacylglycerides, and the free fatty acids are derived from natural oils selected from the group consisting of canola oil, rapeseed oil, coconut oil, corn oil, cottonseed oil, olive oil, palm oil, peanut oil, safflower oil, sesame oil, soybean oil, sunflower oil, linseed oil, palm kernel oil, tung oil, jatropha oil, mustard oil, camelina oil, pennycress oil, hemp oil, algal oil, castor oil, lard, tallow, poultry fat, yellow grease, fish oil, tall oils, and mixtures thereof.

15. The method of claim 1, wherein the monoacylglycerides, the diacylglycerides, the triacylglycerides, and the free fatty acids are derived from palm oil or soybean oil.

16. The method of claim 1, wherein the lipid-based wax composition has a melting point between 55° C. and 75° C.

17. The method of claim 1, wherein the method comprises adding at least one additive to the blended lipid-based wax composition, and wherein the at least one additive is selected from the group consisting of wax-fusion enhancer additives, coloring agents, scenting agents, migration inhibitors, additional optimal wax ingredients, surfactants, co-surfactants, emulsifiers, metals, individually and in combinations thereof.

18. The method of claim 1, wherein the monoacylglycerides and the diacylglycerides comprise a residual inorganic complex selected from the group consisting of phosphates, phosphites, nitrates, sulfates, chlorides, bromides, iodides, nitrides, and mixtures thereof, wherein the concentration of the residual inorganic complex is less than 15 ppm in the monoacylglycerides and the diacylglycerides combined.

19. The method of claim 1, wherein the monoacylglycerides and the diacylglycerides comprise an organic acid selected from the group consisting of citric acid, lactic acid, oxalic acid, carboxylic acid, and mixtures thereof, and further wherein the concentration of the organic acid is less than 500 ppm in the monoacylglycerides and the diacylglycerides combined.

20. The method of claim 1, wherein the cooled molded wax exhibits stability against phase transformation for at least one year when stored at or below 21° C.

21. The method of claim 1, wherein the cooled molded wax exhibits stability against phase transformation for at least one year when stored at or below 27° C.

22. The method of claim 1, wherein the cooled molded wax exhibits stability against phase transformation for at least one year when stored at or below 32° C.

* * * * *